United States Patent [19]

Oberg

[11] 4,277,889
[45] Jul. 14, 1981

[54] GLASS CUTTING MEANS
[75] Inventor: Edwin T. Oberg, Padstow, Australia
[73] Assignee: West End Glass Co. Limited, New South Wales, Australia
[21] Appl. No.: 99,737
[22] Filed: Dec. 3, 1979
[30] Foreign Application Priority Data
  Dec. 7, 1978 [AU] Australia .............................. PD7044
[51] Int. Cl.³ ............................................. C03B 33/10
[52] U.S. Cl. .................................... 30/164.95; 30/292
[58] Field of Search .................. 30/164.9, 164.95, 293, 30/292, 294; 225/96

[56] References Cited
U.S. PATENT DOCUMENTS
3,644,994  2/1972  Lind ........................................ 30/292
4,030,195  6/1977  Inolio ................................. 30/164.95

Primary Examiner—Jimmy C. Peters
Attorney, Agent, or Firm—Michael J. Striker

[57] ABSTRACT

A glass cutter for flat glass comprising a frame having a first arm connected to a transversely disposed second arm, a glass cutting head being slidably disposed on the first arm, which glass cutting head may be selectively locked in position at any desired point along the first arm, and the second arm being provided with rollers or wheels adapted to engage and be guided by an edge of a sheet of glass while the cutting head engages a face thereof. The rollers or wheels being preferably mounted on axes disposed at an angle of from 15° to 75°, preferably 30° to 60° to the longitudinal axis of the first arm.

6 Claims, 6 Drawing Figures

GLASS CUTTING MEANS

The present invention relates to a device for cutting flat glass and more particularly to such a device which includes a guiding frame such that the movement of a cutting head on the device can be guided in its movement over a sheet of glass by a pre-existent edge of the glass sheet.

Glass sheets are conventionally supplied to the trade in the form of very large sheets which are cut up by glass merchants to meet the requirements of end users. This cutting-up process is usually done by hand with a glazier manually measuring up the lines along which the glass is to be cut, positioning a straight-edge along those lines, scribing the line on the glass with the cutting head of the glass cutter and then, by the use of breaking bars snapping the glass along the scribed lines. This task is relatively time consuming and contributes significantly to the final cost of the glass.

It is known to produce glass cutting devices which include a long arm carrying a glass cutting head and a short arm, at right angles to the long arm, which bears against an edge of the glass and guides the cutting head, see U.S. Pat. Nos. 2,674,043 and 1,788,175, however, in such arrangements the glass cutting head is fixedly connected to the long arm and the position of the cutting head is varied by moving the long arm relative to the short arm. This arrangement is inconvenient and cumbersome in use as the weight of the long arm projecting beyond the short arm outside the area of the glass can unbalance the device and make it difficult to apply sufficient pressure to score the glass properly with the glass cutting head.

It is also known to provide a glass cutting head which moves along the long arm of a glass cutting device, see U.S. Pat. Nos. 2,058,091 and 2,200,975, however, in these arrangements the short arm of the glass cutting device does not bear against the glass itself but runs along a guide member adapted to be positioned adjacent the glass. This latter arrangement substantially increases the cost of the glass cutting device and makes it less convenient to use.

The present invention is designed to provide a simple device which can eliminate the need to manually measure up the line along which the glass is to be cut and eliminate the need for a straight-edge to guide the cutting head of the glass cutter while avoiding the disadvantages associated with the prior art arrangements.

The present invention consists in a glass cutting device for flat glass comprising a glass cutting head and a guiding frame; the frame including a pair of arms disposed transversely of one another, the glass cutting head being slidably disposed along one of the arms, glass engaging roller means being disposed along the other arm such that when the roller means are engaged with an edge of a sheet of glass the cutting head can be engaged with the ace of a glass sheet.

In a preferred embodiment of the invention the arrangement is such that the line of contact of the roller means with an edge of a sheet of glass is linear and is disposed substantially at right angles to the line of movement of the cutting head along the one arm.

In a further preferred embodiment of the invention the roller means comprises a plurality of spaced apart rollers which rotate about axes which are disposed at an angle of from 15° to 75°, preferably 30° to 60°, to the longitudinal axis of the one arm, the circumferential face of each roller being circumferentially grooved. This arrangement allows the groove to be engaged with the corner formed by an edge and a face of a sheet of glass which edge can be used as a guide for the cutting head of the glass cutting device. A particular advantage provided by this arrangement is that it is not necessary to hand the glass over the edge of the table on which the glass is being cut. The angled rollers will not project below the lower surface of the glass and will therefore not engage with the surface of the table on which the glass is placed.

The cutting head is preferably formed with restraining means which can retain the cutting head in any desired position along the length of the one arm. In one preferred embodiment of the invention the restraining means comprises manually actuable clamping means adapted to clamp the cutting head at any desired point to the one arm.

The two arms of the guiding frame may meet in an "L" junction or, more preferably, in a "T" junction. The device may be made from any suitable material such as wood or a metal such as aluminium or may be formed from a suitable synthetic material such as a glass reinforced plastics material. The device may be dimensioned to suit the size of glass sheet to be formed, obviously if only small sheets of glass are required then it is easier to use a relatively small device. Typically the one arm may range from 0.5 m to 3.0 m and the other arm may range up to 1.0 m.

Hereinafter given by way of example is a preferred embodiment of the present invention described with reference to the accompanying drawings in which.

Figures 1, 2:
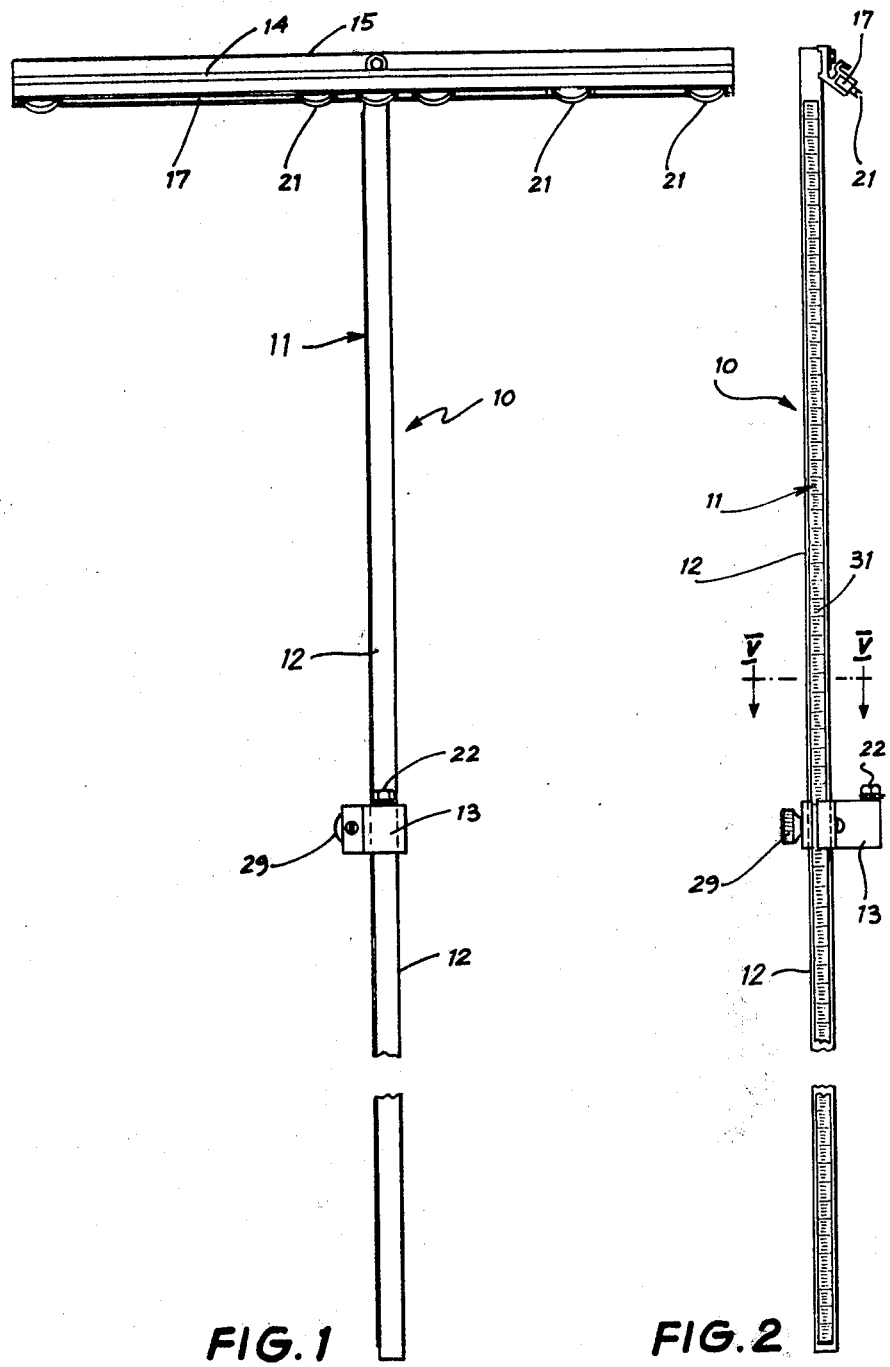
FIG. 1 is a perspective view of the underside of a glass cutting device according to this invention.
FIG. 2 is a side elevational view of the glass cutting device of FIG. 1.
Figure 3:
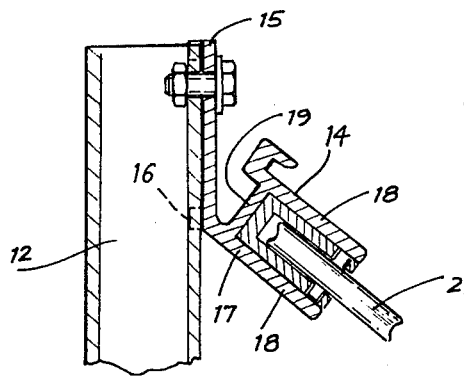
FIG. 3 is a cross-sectional view of the joint between the arms of the glass cutting device of FIG. 1.
Figure 4:
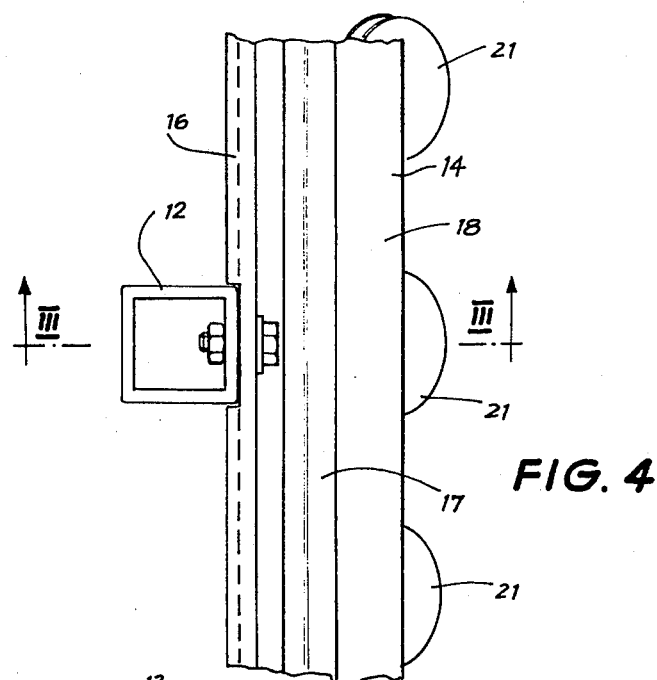
FIG. 4 is an end elevational view of the glass cutter according to FIG. 1 in the region of the joint between the arms of the glass cutting device.
Figure 5:
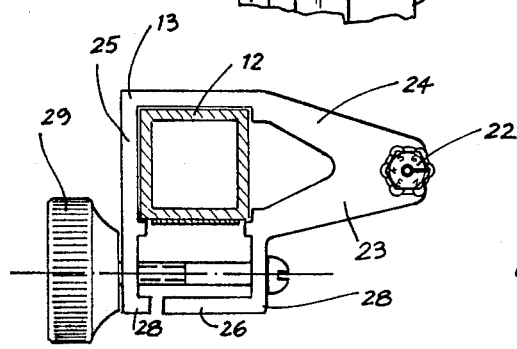
FIG. 5 is a cross-sectional view along V—V of FIG. 1.
Figure 6:
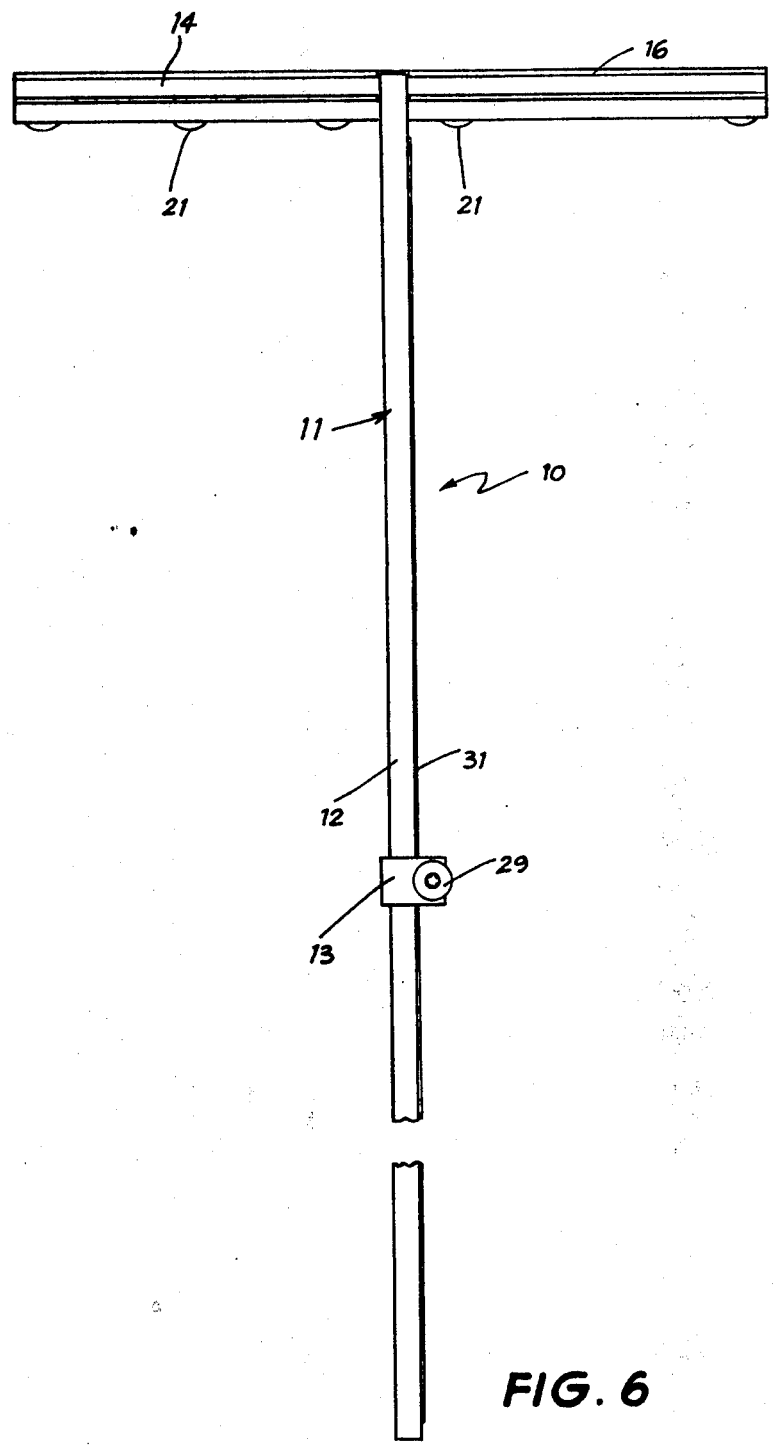
FIG. 6 is a perspective view of the upperside of the glass cutting device of FIG. 1.

The glass cutting device 10 comprises a guiding frame 11 which includes a first arm 12 on which a glass cutting head 13 is slidably mounted and a second arm 14 which is engaged by the first arm 12 in a "T" junction.

The first arm 12 comprises a square section tubular aluminium extrusions. The second arm 14 is formed from an aluminium extrusion having a first planar portion 15 which is provided on either side of its upper side with upstanding ribs 16. A second portion 17 of extrusion of the second arm 14 is formed integrally with the first part 14 and joined to it along one edge thereof. The second portion 17 comprises a pair of parallel spaced apart ribs 18 joined together by web 19 to form a U-section recess disposed at about 40° to the plane of the first portion 15. A row of roller wheels 21 are mounted in the U-section recess of the second arm 14 and project beyond the free edge thereof. Each of the roller wheels 21 is rotatable about an axis normal to the plane of the ribs 18. The roller wheels are each formed with a circumferential groove of semi-circular cross sectional profile.

The glass cutting head 13 comprises a conventional six wheel glass cutter 22 mounted on an aliminium extrusion 23. The extrusion 23 is formed with a thick walled dependant zone 24 to which the cutter 22 is connected. At is upper end the dependant zone 24 merges into a quasi-tubular zone 25 adapted to fit about the first arm 12. Projecting from the open side of the quasi-tubular zone 25 is a clamping zone 26. Bolt 27 projects through the protruding arms 28 of the clamping zone 26 and is in threaded engagement with knurled nut 29. As the nut 29 is screwed down on the bolt 27 the arms 28 are drawn together thereby clamping the cutting head 13 about the first arm 12.

The first arm 12 is connected to the second arm 14 by bolt 20 which extends through predrilled holes in the first and second arms. The second arm 14 is formed with a milled recess 30 at right angles to its longitudinal axis to receive the first arm 12 and maintain it at right angles to the second arm 14.

One side of the first arm 12 is provided with a tape measure 31 glued in place to indicate the length from the point on the first arm corresponding to the line of contact between the roller wheels 21 and the edge of a sheet of glass being cut to the glass cutter 22. This indication of length allows the cutting head to be readily positioned at the required spot along the first arm.

In use the sheet of glass to be cut is laid flat on a cutting table. The cutting head 13 is slid along the first arm 12 of the glass cutting device 10 by an amount equal to the width of the pane of glass to be cut from the sheet, say 1.5 m. The device 10 is then positioned on the sheet of glass and adjacent one end thereof with the groove of the roller wheels 21 resting on the corner formed between a face and an edge of the sheet and the cutter 22 resting on the upper face of the sheet. The device 10 is then moved along the sheet with a firm downward pressure applied such that the cutter 22 scribes the face of the glass as it traverses across the glass. The movement of the device is guided by the roller wheels running along the aforementioned edge of the glass sheet. The glass sheet can then be broken along the scribe mark in the conventional manner.

I claim:

1. A glass cutting device for flat glass comprising a glass cutting head; a guiding frame including a first arm and a second arm which are disposed transversely of one another, said cutting head being slidably positioned along said first arm having a longitudinal axis; and a plurality of rotary rollers having axes of rotation and disposed along said second arm in a spaced relationship, said axes of rotation of said rollers being disposed at an angle of 15° to 75° to said longitudinal axis, said rollers being adapted to engage with an edge of a sheet of glass to be cut when said cutting head engages with the face of the glass sheet.

2. The device of claim 1, in which the line of contact of said rollers with the edge of the glass sheet is linear and is disposed substantially at right angles to the movement of said cutting head along said first arm.

3. The device of claim 2, wherein each of said rollers has a circumferential face, said face being formed with a circumferential groove.

4. The device of claim 3, wherein said cutting head is provided with restraining means which can retain said cutting head in any desired position along said longitudinal axis of said first arm.

5. The device of claim 4, wherein said restraining means comprise manually actuable clamping means adapted to clamp said cutting head on said first arm in any desired position.

6. The device of claim 1, wherein said angle is preferably 30° to 60°.

* * * * *